US011811804B1

(12) United States Patent
Altmaier et al.

(10) Patent No.: US 11,811,804 B1
(45) Date of Patent: Nov. 7, 2023

(54) SYSTEM AND METHOD FOR DETECTING PROCESS ANOMALIES IN A DISTRIBUTED COMPUTATION SYSTEM UTILIZING CONTAINERS

(71) Applicant: Red Hat, Inc., Raleigh, NC (US)

(72) Inventors: Joseph Altmaier, Mountain View, CA (US); Hillary Benson, Mountain View, CA (US); Robert A. Cochran, Mountain View, CA (US); Connor Gorman, Mountain View, CA (US); Viswajith Venugopal, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 290 days.

(21) Appl. No.: 17/122,808

(22) Filed: Dec. 15, 2020

(51) Int. Cl.
 *H04L 9/40* (2022.01)
(52) U.S. Cl.
 CPC ...... *H04L 63/1425* (2013.01); *H04L 63/1416* (2013.01)
(58) Field of Classification Search
 CPC ............ H04L 63/1425; H04L 63/1416
 USPC .......................................................... 726/23
 See application file for complete search history.

(56) References Cited

U.S. PATENT DOCUMENTS

| 9,317,304 | B2 | 4/2016 | Collado et al. |
| 9,524,214 | B1 | 12/2016 | Isdal et al. |
| 9,531,745 | B1 * | 12/2016 | Sharma ................. G06F 40/205 |
| 10,397,255 | B1 | 8/2019 | Bhalotra et al. |
| 10,671,723 | B2 * | 6/2020 | Krebs ................... G06F 21/577 |
| 11,316,877 | B2 * | 4/2022 | Krebs ..................... H04L 43/16 |
| 2006/0101402 | A1 * | 5/2006 | Miller ................. G06F 11/3636 717/124 |
| 2010/0023810 | A1 | 1/2010 | Stolfo et al. |
| 2010/0107180 | A1 | 4/2010 | Ulrich |
| 2010/0122343 | A1 * | 5/2010 | Ghosh ................. G06F 9/45545 726/23 |
| 2012/0137367 | A1 * | 5/2012 | Dupont .................. G06F 21/00 726/25 |
| 2012/0210333 | A1 | 8/2012 | Potter et al. |
| 2013/0097659 | A1 | 4/2013 | Das et al. |
| 2014/0289807 | A1 | 9/2014 | Collado et al. |
| 2014/0310564 | A1 * | 10/2014 | Mallige ............... G06F 11/0751 714/47.1 |
| 2016/0072831 | A1 | 3/2016 | Rieke |
| 2016/0094582 | A1 | 3/2016 | Watson et al. |

(Continued)

OTHER PUBLICATIONS

Kim, et al., "TOSCA-Based and Federation-Aware Cloud Orchestration for Kubernetes Container Platform," Applied Sciences, vol. 9, No. 191, Jan. 2019, 13 pages.

(Continued)

*Primary Examiner* — Badri Narayanan Champakesan
(74) *Attorney, Agent, or Firm* — Dority & Manning, P.A.

(57) ABSTRACT

A server has a processor and a memory connected to the processor. The memory stores instructions executed by the processor to collect operating signals from machines. The operating signals characterize container activities. The container activities are isolated processes in user space designated by an operating system kernel. The container activities are ascribed a container lifecycle phase characterized as one of container startup, container steady state and container shutdown. A process anomaly is identified when container lifecycle phase activity deviates from baseline container lifecycle phase activity.

20 Claims, 8 Drawing Sheets

(56) References Cited

U.S. PATENT DOCUMENTS

| | | |
|---|---|---|
| 2016/0099963 A1 | 4/2016 | Mahaffey et al. |
| 2017/0063905 A1* | 3/2017 | Muddu ................... G06N 7/01 |
| 2017/0180399 A1 | 6/2017 | Sukhomlinov et al. |
| 2017/0353496 A1 | 12/2017 | Pai et al. |
| 2018/0019969 A1 | 1/2018 | Murthy |
| 2018/0157524 A1 | 6/2018 | Saxena et al. |
| 2018/0219863 A1 | 8/2018 | Tran |
| 2019/0318240 A1 | 10/2019 | Kulkarni et al. |
| 2019/0319987 A1 | 10/2019 | Levy et al. |
| 2019/0342335 A1 | 11/2019 | Ni et al. |
| 2020/0112487 A1 | 4/2020 | Inamdar et al. |
| 2021/0194931 A1 | 6/2021 | Parashar et al. |
| 2022/0012336 A1* | 1/2022 | Lakkundi .............. G06F 21/564 |

OTHER PUBLICATIONS

Non-Final Office Action for U.S. Appl. No. 16/805,208, dated Jul. 7, 2021, 13 pages.
Non-Final Office Action for U.S. Appl. No. 15/273,482, dated Jul. 17, 2018, 17 pages.
Final Office Action for U.S. Appl. No. 15/273,482, dated Feb. 11, 2019, 18 pages.
Notice of Allowance for U.S. Appl. No. 15/273,482, dated May 10, 2019, 9 pages.
Applicant-Initiated Interview Summary for U.S. Appl. No. 16/805,208, dated Oct. 6, 2021, 5 pages.
Final Office Action for U.S. Appl. No. 16/805,208, dated Dec. 10, 2021, 13 pages.

* cited by examiner

SYSTEM AND METHOD FOR DETECTING PROCESS ANOMALIES IN A DISTRIBUTED COMPUTATION SYSTEM UTILIZING CONTAINERS

FIELD OF THE INVENTION

This invention relates generally to computer security. More particularly, this invention relates to techniques for detecting process anomalies in a distributed computation system utilizing application containers.

BACKGROUND OF THE INVENTION

Modern software applications are designed to be modular, distributed, and interconnected. Some advanced software systems go a step further and divide complex applications into micro-services. Micro-services refer to software architectures in which complex applications are composed of many small, independent processes communicating with one another. Micro-services enable unprecedented efficiency and flexibility. However, microservices architectures create a host of new security challenges, so a new security solution is required. The ideal solution will leverage the advantages of the microservices approach and properly protect both micro-services and traditional systems. As used herein, the term application includes a traditional monolithic code stack forming an application and a micro-services instantiation of an application.

Application containers provide compute capabilities that dramatically improve scalability, efficiency, and resource usage. Application containers are sometimes called containers or software containers. Any such container packages an application and all its dependencies as an isolated process in the user space of an operating system. An operating system kernel uses technologies, such as namespaces and cgroups to enforce isolation between containers.

Containers can be run in on-premises data centers, private cloud computing environments, public cloud computing environments and on both bare metal servers and virtual machines. Containers are designed to be portable across different computing infrastructure environments, isolate applications from one another and enable improved resource utilization and management.

A container orchestrator is a container management tool. More particularly, a container orchestrator automates deployment, scaling and management of services that containers implement. Kubernetes is an open source container orchestrator. Kubernetes defines a set of building blocks or primitives that collectively provide mechanisms that deploy, maintain and scale applications based on CPU, memory or custom metrics. Kubernetes defines resources as different types of objects. The basic scheduling unit in Kubernetes is a pod, which is one or more containers that are co-located on a host machine. Each pod in Kubernetes is assigned a unique pod Internet Protocol (IP) address within a cluster.

A Kubernetes workload is a set of pods that execute a function. The set of pods form a service defined by a label selector. Kubernetes provides a partitioning of resources into non-overlapping sets called namespaces. Namespaces are intended for use in environments with many users spread across multiple teams, projects or deployments.

Securing containers, the applications that run within them, and the software infrastructure surrounding the containers is challenging. Advanced machine learning models have been used to identify anomalous workloads. However, such machine learning models are not container or Kubernetes aware. Consequently, they are prone to false positives and incorrect data. Thus, there is a need for detecting process anomalies in a distributed computation system utilizing application containers.

SUMMARY OF THE INVENTION

A server has a processor and a memory connected to the processor. The memory stores instructions executed by the processor to collect operating signals from machines. The operating signals characterize container activities. The container activities are isolated processes in user space designated by an operating system kernel. The container activities are ascribed a container lifecycle phase characterized as one of container startup, container steady state and container shutdown. A process anomaly is identified when container lifecycle phase activity deviates from baseline container lifecycle phase activity.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
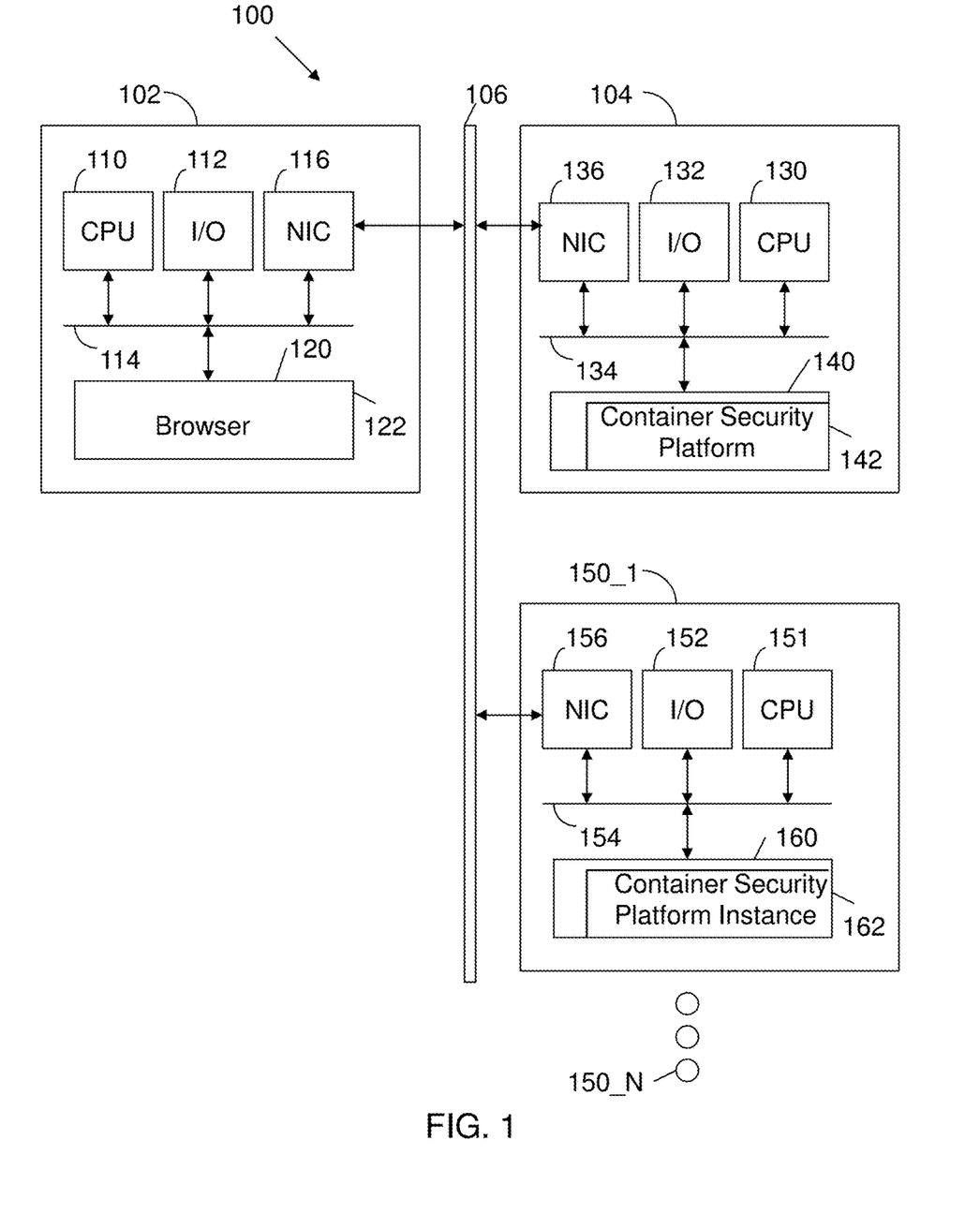
FIG. 1 illustrates a system configured in accordance with an embodiment of the invention.

FIG. 1 illustrates a system 100 configured in accordance with an embodiment of the invention. The system 100 includes a client machine 102 and at least one server 104 connected via a network 106, which may be any combination of wired and wireless networks. The client machine 102 includes standard components, such as a central processing unit or processor 110 and input/output devices 112 connected via a bus 114. The input/output devices 112 may include a keyboard, mouse, touch display and the like. A network interface circuit 116 is also connected to the bus to provide connectivity to network 106. A memory 120 is also connected to the bus. The memory 120 may store a browser 122, which may be used to access server 104. As discussed below, the client machine 102 may access server 104 to supervise the activity of distributed computation system utilizing containers. More particularly, the client machine 102 may monitor for processing anomalies in containers hosted by the distributed computation system.

Server 104 also includes standard components, such as a central processing unit 130, input/output devices 132, bus 134 and network interface circuit 136 to provide connectivity to network 106. A memory 140 is connected to bus 134. The memory 140 stores instructions executed by the central processing unit 130 to implement operations disclosed herein. In particular, the memory 140 stores a container security platform (CSP) 142 to implement operations disclosed herein. The container security platform 142 is operative with container security platform instances 162 distributed across a set of machines 150_1 through 150_N. The term container security platform instance is used to denote that any such instance may be a full container security platform or a subset of the functionality associated with a full container security platform. Any of machines 104 and 150_1 through 150_N may be either a physical or virtual machine. The container security platform 140 and container security platform instances run alongside applications executed within containers.

Machine 150_1 also includes standard components, such as a central processing unit 151, input/output devices 152, bus 154 and network interface circuit 156. A memory 160 is connected to bus 154. The memory 160 stores a container security platform instance 162, which includes instructions executed by the central processing unit 151 to implement operations disclosed herein.

Figure 2:
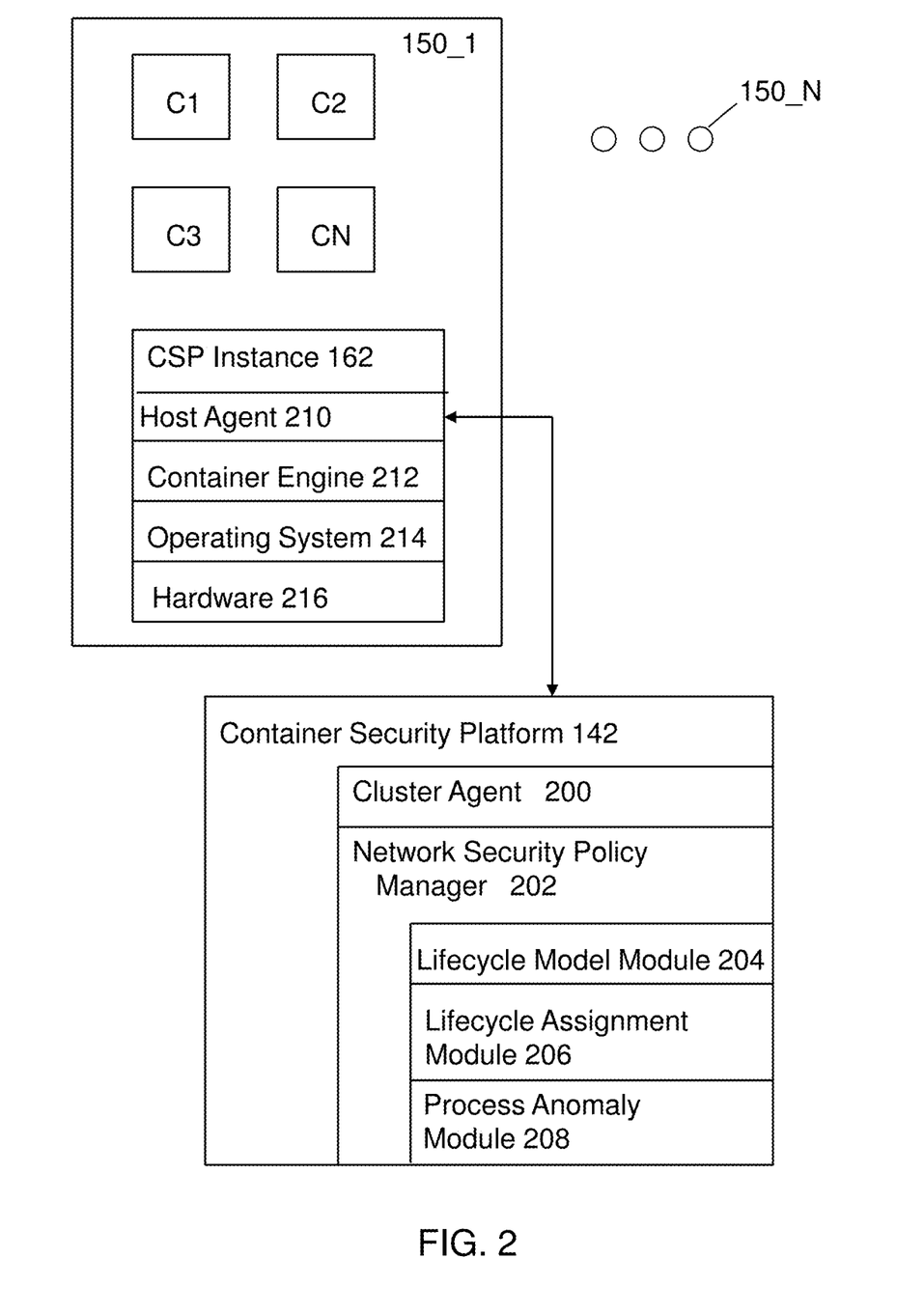
FIG. 2 is a more detailed characterization of certain components of FIG. 1.

FIG. 2 more fully characterizes certain components of FIG. 1. The figure illustrates machines 150_1 through 150_N. Machine 150_1 includes the container security platform instance 162, which operates in communication with a container engine 212, also commonly referred to as a container runtime. For example, the container engine 212 may be Docker®. Docker® is an open source project that automates the deployment of Linux applications inside software containers. The container engine 212 may also be a component of the previously referenced Kubernetes container orchestrator.

The container engine 212 forms different containers C1, C2, C3, and CN on machine 150_1. Each container may execute a different application (including micro-services). Each container may also execute the same application for scalability, redundancy, availability or other reasons. Alternatively, each container may execute the same application, but for different tenants in a multi-tenant environment. The container engine 212 is operative on top of operating system 214, which may be a host operating system, which executes on hardware 216 (e.g., CPU 130, memory 140, etc.), or a guest operating system, which executes on a hypervisor. The CSP instance 162 interacts with both the container engine 212 and operating system 214 and continuously or periodically sends and receives data to and from the container security platform 142.

Machine 150_1 also includes a host agent 210. The host agent monitors the activity of system calls that relate to the establishing or closing of network connections, targeting processes that are identified to be running in a container, and using this to build a per-host state of all current or recent outgoing network connections (with destination IP and port) for each container running on the host. The dynamic monitoring of network-related system call activity is complemented by an analysis of the current system state (made accessible by the Linux kernel via the proc filesystem) in order to identify outgoing network connections that were established before the host agent was deployed.

The container security platform 142 may include a number of modules. Each module may be implemented as a container or collection of containers. Thus, a set of containers that comprise the CSP is operative to analyze activity in other containers. The container security platform 142 includes a cluster agent 200.

The cluster agent 200 continuously monitors the orchestrator state and maintains information in a data structure that is preferably optimized for fast lookups and updates. In one embodiment, the information maintained by the cluster agent 200 includes an association of container IDs to orchestrator workload (e.g., deployment or daemonset). The maintained information may also include an association of IP as well as IP:port addresses to orchestrator workloads. One association is so-called "pod IPs" that correspond to the smallest schedulable units of which a workload is comprised. Another association is Service IPs, which are virtual IPs that get routed to workloads (any number of workloads, not limited to one). Another association is Node IPs, on which certain ports get routed to services (and thus workloads) by using an exposure type called NodePort.

The cluster agent 200 includes a correlation engine which, based on the above information, translates the set of outgoing network connections per container into a list of network connections between orchestrator workloads.

The container security platform 142 also includes a network security policy manager 202, which provides process security. In one embodiment, the network security policy manager 202 includes a lifecycle model module 204, which stores baseline container lifecycle phase activity models. A lifecycle assignment module 206 includes instructions executed by a processor to collect operating signals from machines 150_1 through 150_N. The operating signals characterize container activities. The lifecycle assignment module 206 ascribes a container lifecycle phase to the container activities. The container lifecycle phase is characterized as one of container startup, container steady state and container shutdown. The process anomaly module 208 includes instructions executed by a processor to identify a process anomaly when container lifecycle phase activity deviates from baseline container lifecycle phase activity reflected in the baseline container lifecycle phase activity models of lifecycle model module 204.

Figure 3:
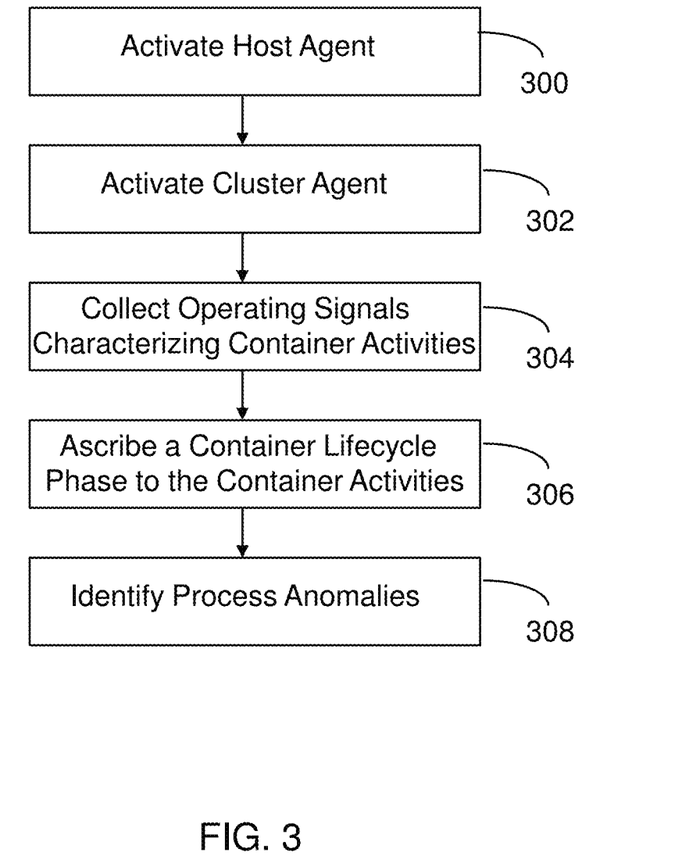
FIG. 3 illustrates processing operations performed in accordance with an embodiment of the invention.

FIG. 3 illustrates processing operations associated with an embodiment of the invention. The host agent 210 is activated 300 on one or more machines 150_1 through 150_N. The cluster agent 200 is activated 302 on the container security platform 142. Operating signals characterizing container activities are collected 304. The lifecycle assignment module 206 may collect the signals. A container lifecycle phase is ascribed to the container activities 306. The container lifecycle phase is characterized as one of container startup, container steady state and container shutdown. The lifecycle assignment module 206 may perform this operation. The lifecycle assignment module 206 uses the timestamp of the process, the container start time, and the container end time to determine the lifecycle. If the timestamp is soon after the container start time, it is startup. If it is soon before the end time, it is shutdown. Otherwise, it is steady state. To determine start and end time, the module continuously monitors the orchestrator to observe container starts and ends, so it can use this information.

Process anomalies are identified 308. The process anomaly module 208 determines when container lifecycle phase activity deviates from baseline container lifecycle phase activity reflected in the baseline container lifecycle phase activity models of lifecycle model module 204.

The operating signals characterizing container activities include the lineage (parents of the process), the arguments, the executed file path and the process name, and the container identifier that the processes originated from. Consider the following operating signals characterizing container activities:

{"deploymentId":"e4d36a4f-01df-11eb-bae4-025000000001","podId":"server-xxgv4", "containerName":"sidecar","namespace":"production","containerStartTime":"2020-09-28T23:11:12Z","signal": {"name":

"sidecar","execFilePath":"/bin/sidecar","time" :"2020-09-28T23:11:12.398075970Z","args":"","lineageInfo":[]}}
{"deploymentId":"e4d36a4f-01df-11eb-bae4-025000000001","podId":"server-xxgv4", "containerName":"server","namespace":"production","containerStartTime":"2 020-09-28T23:11:12Z","signal": {"name": "bootstrap.sh","execFilePath":"/usr/bin/bash","time": "2020-09-28T23:11:11.928075973Z", "args":"/ bootstrap.sh/bin/sh-c start-server.sh--config $SERVER_CONFIG","lineageInfo": []}}
{"deploymentId":"e4d36a4f-01df-11eb-bae4-025000000001","podId":"server-xxgv4", "containerName":"server","namespace":"production","containerStartTime":"2 020-09-28T23:11:12Z","signal": {"name": "server","execFilePath":"/usr/local/bin/server","time": "2020-09-28T23:11:22.478075904Z", "args":"--config={\"logs\":{\"DEBUG"}","lineageInfo":[{"parentUid":0,"parentExecFilePath": "/usr/bin/bash"}]}}
{"deploymentId":"da60abe3-01df-11eb-bae4-025000000001","podId":"database-85c4d5cd57-xjwwt", "containerName":"database","namespace":"production", "containerStartTime":"2020-09-28T23:10:57Z", "signal": {"name":"database","execFilePath":"/bin/database","time":"2 020-09-28T23:10:57.696227870Z", "args":"","lineageInfo":[]}}

Each bullet point represents a process. For each process, there is Kubernetes context about which container it is running in (provided by the "deploymentId", "podId", "containerName" and "namespace"), the container start time, and information about the process itself (under the "signal" key). The first three processes are all run in the collector pod—the first in the compliance container, and the second and third in the collector container. The process name is specified: the execFilePath (that is, the executable file that is run to start the process). The time the process was launched is specified, the arguments it was invoked with and lineageInfo are also specified. LineageInfo specifies which process launched a given process. Observe that the lineageInfo is always empty for the first process launched in a specific container. The third process, called "server" with execFilePath: "/usr/local/bin/server", is a child of the second process, with execFilePath "/usr/bin/bash", as denoted by the entry in its lineageInfo, under "parentExecFilePath".

Whenever a new (deploymentId, containerName) pair is seen, a new baseline is created for that container within that deployment. Then, the process execFilePath is added to the baseline, until the baseline is locked, which happens after the system determines that it has collected enough data. After the baseline is locked, any processes that are seeing running in the same (deploymentId, containerName) pair are not added to the baseline, and the user sees them as anomalies.

The startup lifecycle transpires just after the container starts. It is typically extremely quick (on the order of a few seconds) and involves the running of some scripts to configure properly the main application of the container, and to ensure that the container can run successfully.

The steady-state lifecycle is what a given container is in most of the time, once it finishes start up. Typically, there is one process that is running at this time, which is in some sense the "main" process of this container. Depending on the application, this process can be a server for web requests, or a system that is running some data processing. It typically runs until the container is given a signal to exit, or it detects that it has completed all its work.

The shutdown lifecycle transpires just before a container exits, and right after it ends steady state. The shutdown lifecycle usually involves doing work to clean up intermediate files and other state that the container used in steady-state, so as to minimize resource leakage and ensure that any data persisted beyond the container (say, in some files or in a database) is in a good state. It typically lasts just a few seconds (by default, Kubernetes only allows a container to run for 30 seconds after giving it the termination signal, in which time the container is expected to finish its shutdown work). The shutdown lifecycle is challenging for process baselining because it will involve the execution of processes that are typically not seen in startup or steady state; however, they can be distinguished because the container will exit soon after these processes are run.

The process anomaly module 208 generates alerts based on what should and should not run in each lifecycle phase. Containers have relatively few process interactions, and so the "tree" of process executions—composed of "parent" processes, connected to the "child" processes they launch—is relatively streamlined. To take advantage of this, process lineage is integrated as a feature to determine if a process is normally launched from a specific parent process. This affords greater certainty in designating a process as unusual.

In Kubernetes, containers are frequently "replicated". That is, multiple identical instances of a container are executed and work together. By taking this into account, anomaly detection is enhanced in the following ways. First, with more data there is more efficacy and faster learning. That is, by combining data from multiple replicas of the same container, there is an increase in the amount of data considered, which increases efficacy and decreases the amount of learning time needed when determining if a process is anomalous.

Since replicas should be identical, process activity is compared across replicas to identify outlier replicas, which are not uniform with the rest of the replicas. This further boosts efficacy in determining if there is something anomalous occurring within the containers in a set.

Figure 4:
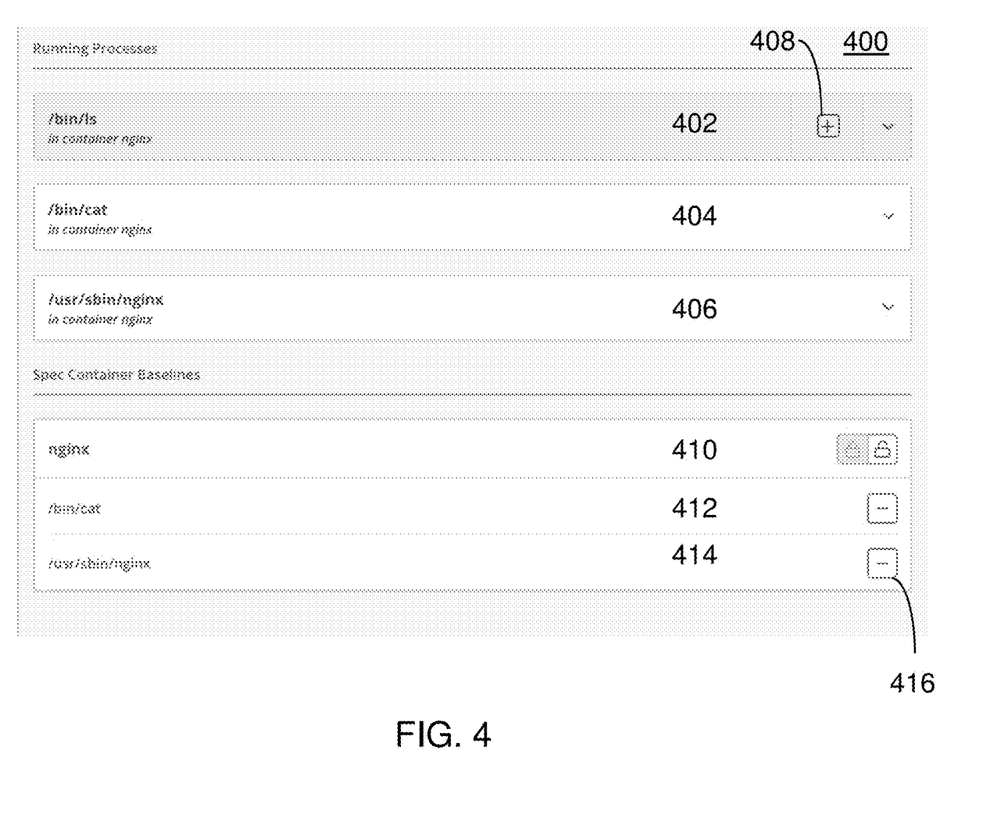
FIG. 4 illustrates an interface for adding and deleting processes to baseline models.

The system allows users to make corrections. For example, FIG. 4 shows an interface 400 listing running processes 402, 404 and 406 for a container. The process 402 runs outside the baseline so it is shaded. The user can click on the plus sign 408 next to any of those processes to manually add them to the baseline.

Elements 410, 412 and 414 are processes that are in the baseline; the user can click on the minus sign 416 next to any of those processes to remove them from the baseline.

Figure 5:
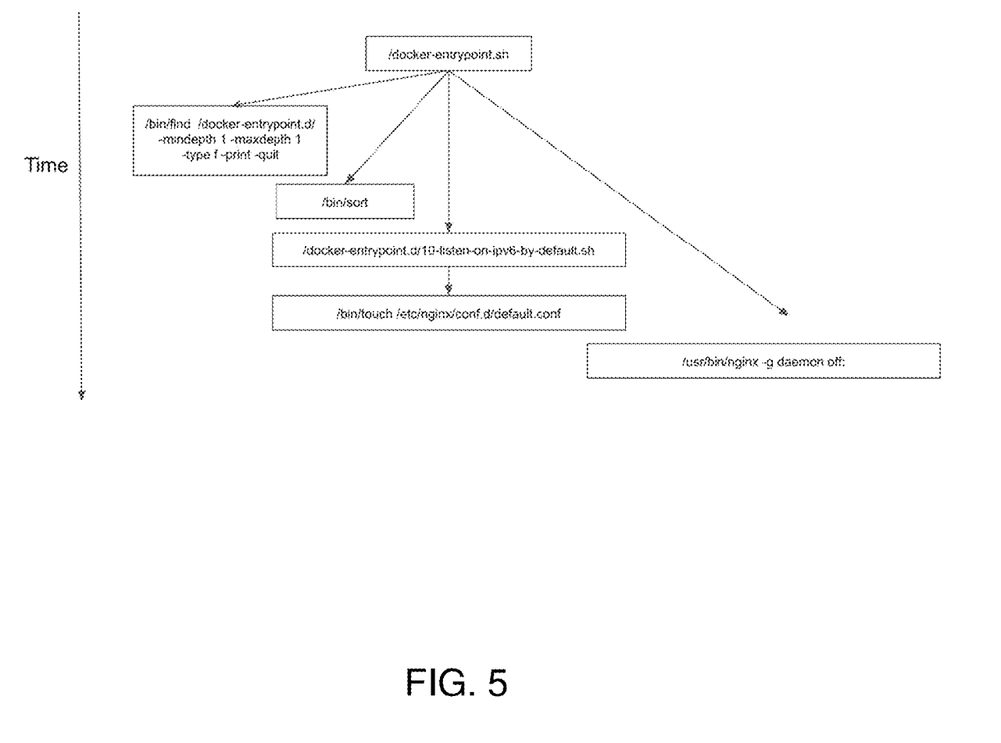
FIG. 5 is an example of a tree of process executions.

FIG. 5 is an example of a tree of process executions, in an nginx container. Initially, a script is run called '/docker-entrypoint.sh'. This script runs other processes in order to select which other script to run (this is the '/bin/find' and '/bin/sort'), and runs that script (which is the '/docker-entrypoint.d/10-listen-on-ipv6-by-default.sh' script), which in turn sets up a configuration file (which is the '/bin/touch'). Finally, after this is done, the script invokes the nginx server itself via '/usr/bin/nginx-g daemon off;'. Process lineage of the type shown in FIG. 5 is analyzed by the process anomaly module 208 to identify unusual parent and child relationships.

Figure 6:
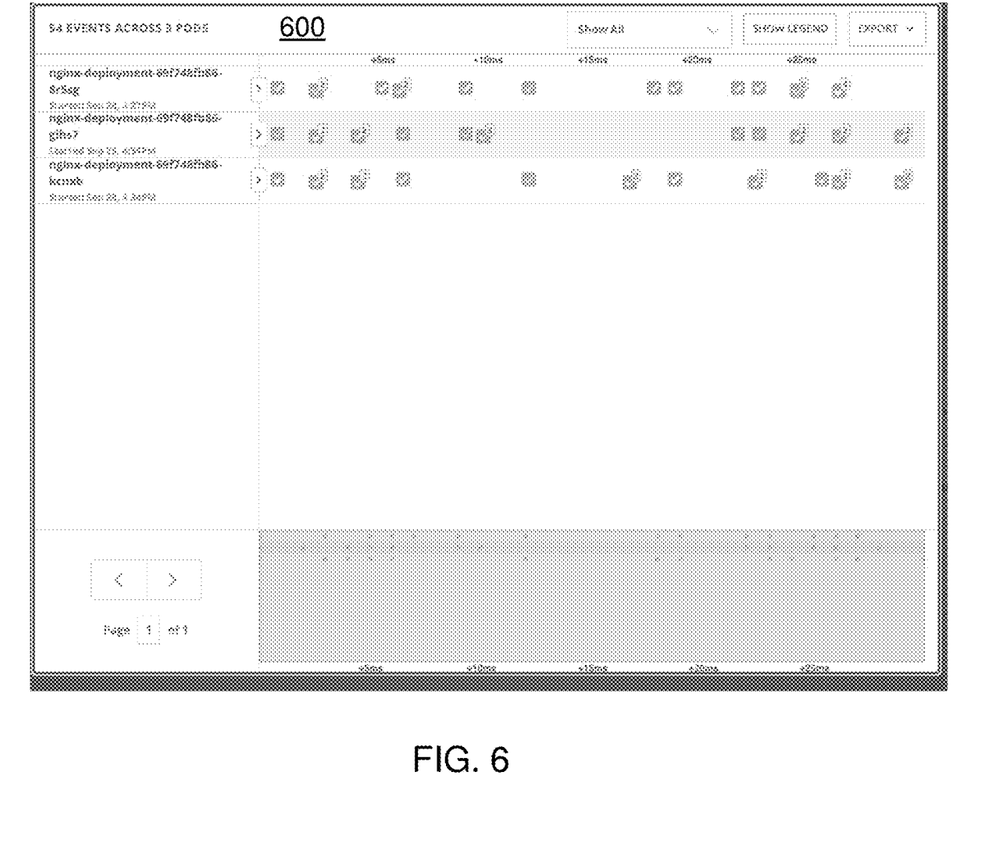
FIGS. 6-8 illustrate interfaces to monitor replica processing.

FIG. 6 illustrates an interface 600 to track replica processing. In this example, a deployment called nginx is running, with three replicas, denoted by the fact that there are three pods (a pod is a set of related containers that performs a function; in this case, each pod contains only one container). Each of the squares represents an execution of the process within that pod. All the replicas executed 18 processes soon after they start.

Although the pods started at different times (as can be seen from the start time in the left column), the timeline is organized so that each pod's line starts at the time it started, so that the user can visually compare how process launches in the different replicas compare relative to the time each replica started.

Figure 7:
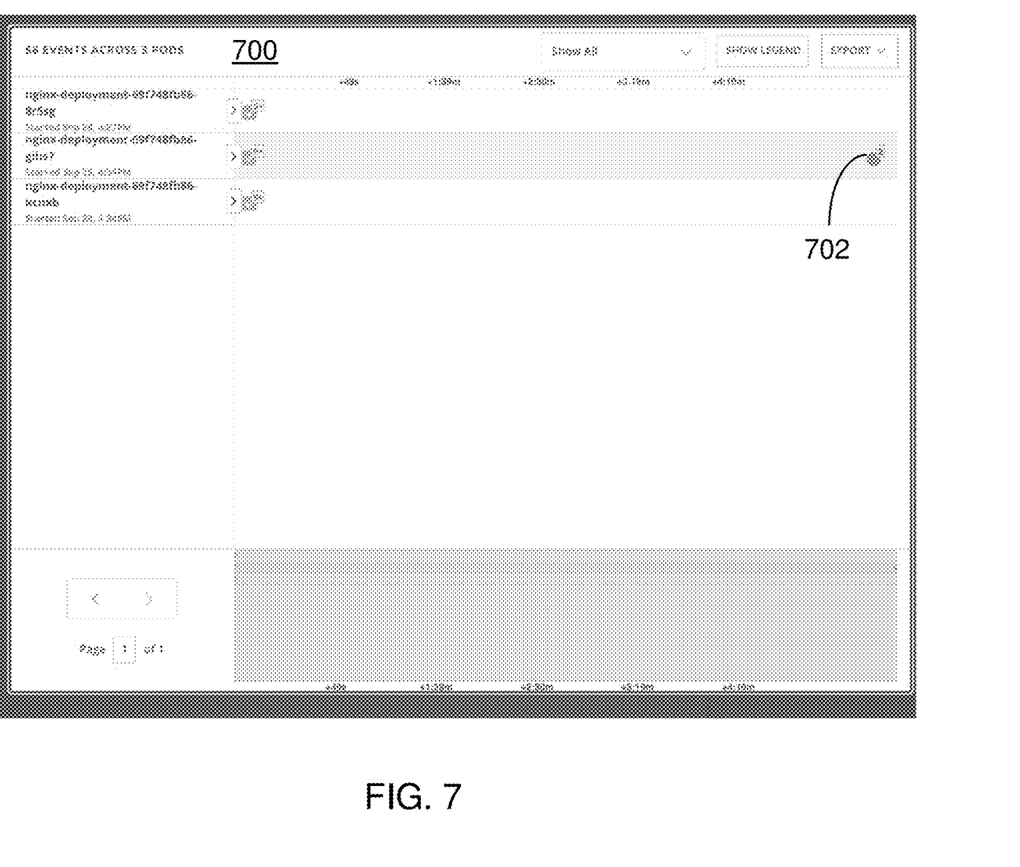
Figure 8:
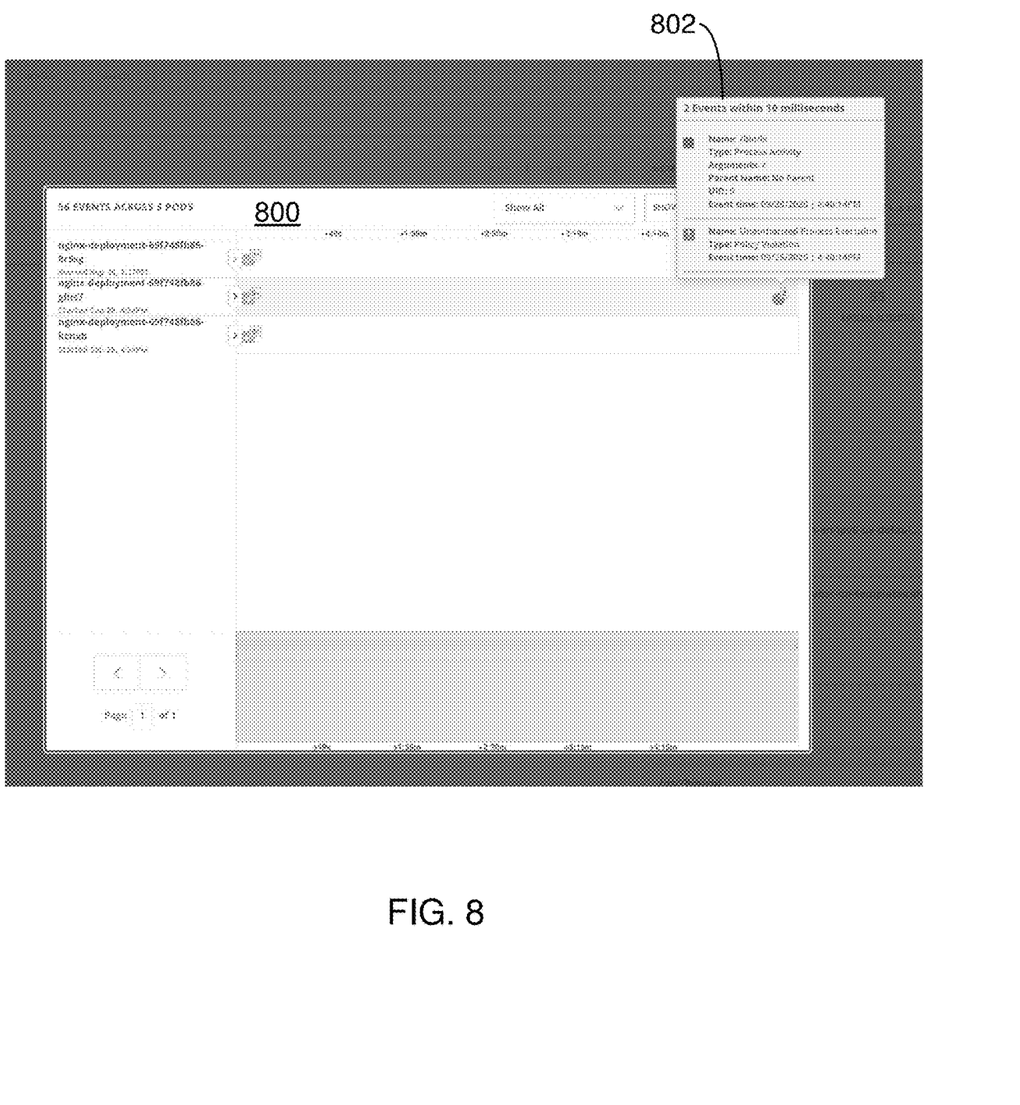

FIG. 7 illustrates an interface 700 with the same deployment a little later in time. In this case, there is a new process 702 that is executed only on one of the replicas, and not on the others. The new process 702 is marked as an "Unauthorized Process Execution". (The 18 processes for each pod from the FIG. 6 are collapsed into the one square on the left, since they happened in a very short time span). Clicking on icon 702 results in the interface 800 of FIG. 8. Panel 802 provides information on the process.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A server, comprising:
   a processor; and
   a memory connected to the processor, the memory storing instructions executed by the processor to:
   collect operating signals from machines, wherein the operating signals characterize processes running in containers and each operating signal includes a process lineage and an executed file path for a process running in a container,
   ascribe a container lifecycle phase to the processes, wherein the container lifecycle phase is characterized as one of container startup, container steady state and container shutdown,
   identify a process anomaly when a process running in a container during the container lifecycle phase deviates from a baseline for the container during the container lifecycle phase, wherein the process anomaly corresponds to the process, and
   present, on a display device, a user interface that lists processes running in the container and identifies the process anomaly.

2. The server of claim 1 wherein the instructions executed by the processor to identify the process anomaly include instructions executed by the processor to evaluate the process lineage.

3. The server of claim 2 wherein the instructions executed by the processor to evaluate the process lineage evaluate whether there is a deviation from a typical parent process for a child process.

4. The server of claim 1 wherein the instructions executed by the processor to identify the process anomaly include instructions executed by the processor to evaluate process replicas for anomalous behavior.

5. The server of claim 1 further comprising instructions executed by the processor to provide an interface for adding and deleting processes to the baseline for the container.

6. The server of claim 1 further comprising instructions executed by the processor to:
   identify a new deployment identifier and container name for a container, wherein the container is within a deployment identified by the deployment identifier, and
   create a baseline for the container, wherein the baseline includes an executed file path for a process running in the container.

7. The server of claim 1 wherein the container lifecycle phase is based on a timestamp of a process running in a container, the container start time, and the container end time.

8. A method, comprising:
   collecting, by a server comprising a processor and a memory connected to the processor, operating signals from machines, wherein the operating signals characterize processes running in containers and each operating signal includes a process lineage and an executed file path for a process running in a container,
   ascribing, by the server, a container lifecycle phase to the processes, wherein the container lifecycle phase is characterized as one of container startup, container steady state and container shutdown,
   identifying, by the server, a process anomaly when a process running in a container during the container lifecycle phase deviates from a baseline for the container during the container lifecycle phase, wherein the process anomaly corresponds to the process, and
   presenting, on a display device, a user interface that lists processes running in the container and identifies the process anomaly.

9. The method of claim 8, wherein identifying the process anomaly comprises evaluating the process lineage.

10. The method of claim 9, wherein evaluating the process lineage comprises evaluating whether there is a deviation from a typical parent process for a child process.

11. The method of claim 8, wherein identifying the process anomaly comprises evaluating process replicas for anomalous behavior.

12. The method of claim 8, further comprising:
providing an interface for adding and deleting processes to the baseline for the container.

13. The method of claim 8, further comprising:
identifying a new deployment identifier and container name for a container, wherein the container is within a deployment identified by the deployment identifier, and
creating a baseline for the container, wherein the baseline includes an executed file path for a process running in the container.

14. The method of claim 8, wherein the container lifecycle phase is based on a timestamp of a process running in a container, the container start time, and the container end time.

15. A non-transitory computer-readable storage medium that includes computer-executable instructions that, when executed, cause one or more processor devices to:
collect operating signals from machines, wherein the operating signals characterize processes running in containers and each operating signal includes a process lineage and an executed file path for a process running in a container,
ascribe a container lifecycle phase to the processes, wherein the container lifecycle phase is characterized as one of container startup, container steady state and container shutdown,
identify a process anomaly when a process running in a container during the container lifecycle phase deviates from a baseline for the container during the container lifecycle phase, wherein the process anomaly corresponds to the process, and
present, on a display device, a user interface that lists processes running in the container and identifies the process anomaly.

16. The non-transitory computer-readable storage medium of claim 15, wherein to identify the process anomaly, the instructions are further to cause the processor device to evaluate the process lineage.

17. The non-transitory computer-readable storage medium of claim 16, wherein to evaluate the process lineage, the instructions are further to cause the processor device to evaluate whether there is a deviation from a typical parent process for a child process.

18. The non-transitory computer-readable storage medium of claim 15, wherein to identify the process anomaly, the instructions are further to cause the processor device to evaluate process replicas for anomalous behavior.

19. The non-transitory computer-readable storage medium of claim 15, wherein the instructions are further to cause the processor device to:
provide an interface for adding and deleting processes to the baseline for the container.

20. The non-transitory computer-readable storage medium of claim 15, wherein the instructions are further to cause the processor device to:
identify a new deployment identifier and container name for a container, wherein the container is within a deployment identified by the deployment identifier, and
create a baseline for the container, wherein the baseline includes an executed file path for a process running in the container.

* * * * *